US007467189B2

(12) United States Patent
Siles et al.

(10) Patent No.: US 7,467,189 B2
(45) Date of Patent: Dec. 16, 2008

(54) RESOURCE IDENTIFIER ZONE TRANSLATION

(75) Inventors: Yosef Siles, Redmond, WA (US); Alik Teplitsky, Afula (IL); Oren Trutner, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 764 days.

(21) Appl. No.: 11/040,491

(22) Filed: Jan. 21, 2005

(65) Prior Publication Data

US 2006/0168345 A1 Jul. 27, 2006

(51) Int. Cl.
G06F 15/16 (2006.01)
(52) U.S. Cl. ...................................... 709/217; 709/245
(58) Field of Classification Search ......... 709/200–203, 709/217–227, 245
See application file for complete search history.

(56) References Cited

U.S. PATENT DOCUMENTS

| 6,154,776 | A | 11/2000 | Martin |
| 6,665,674 | B1 | 12/2003 | Buchanan et al. |
| 6,680,942 | B2 | 1/2004 | Mead et al. |
| 6,701,374 | B2* | 3/2004 | Gupta et al. ................. 709/238 |
| 6,732,105 | B1* | 5/2004 | Watson et al. ................. 707/10 |
| 6,799,197 | B1 | 9/2004 | Shetty et al. |
| 7,002,973 | B2 | 2/2006 | MeLampy et al. |
| 7,184,999 | B1* | 2/2007 | Watson et al. ................... 707/2 |
| 2001/0042104 | A1 | 11/2001 | Donoho et al. |
| 2003/0200332 | A1* | 10/2003 | Gupta et al. ................. 709/238 |
| 2004/0177152 | A1* | 9/2004 | Aviran ......................... 709/235 |
| 2004/0215775 | A1* | 10/2004 | Murray et al. .............. 709/225 |
| 2005/0005107 | A1* | 1/2005 | Touboul ...................... 713/165 |
| 2005/0091343 | A1* | 4/2005 | Murray, Jr. .................. 709/219 |

FOREIGN PATENT DOCUMENTS

EP 1113648 7/2001

OTHER PUBLICATIONS

Archie, "Control Directory Services with LDAP Proxy," WindowsITPro, available at <<http://www.winntmag.com/Articles/Index.cfm?ArticleID7281>>, Retrieved on Oct. 18, 2004, 4 pages.
Octetstring, Inc.: "Directory Federator Express," 'Online!2003, pp. 1-10, XP002364765 available at <<http://octetstring.com/pdf/DFE-Whiter-paper.pdf>>, retrieved on Jan. 26, 2006, pp.
Donnelly, "An Introduction to LDAP," available at <<http://ldapman.org/articles/intro_to_ldap.html printed>>, Oct. 18, 2004, 9 pages.

(Continued)

*Primary Examiner*—Moustafa M Meky
(74) *Attorney, Agent, or Firm*—Lee & Hayes, PLLC

(57) ABSTRACT

Methods, systems and apparatus are described for resource identifier translation. In an implementation, a method includes in a network environment having at least two separate resource identifier (ID) zones, collecting translation information, from first and second information producers, which describes translation of a resource ID between first and second resource ID zones. The collected translation information is distributed to one or more consumers for translating a resource suitable for implementation in the first resource ID zone such that the translated resource is suitable for implementation in the second resource ID zone.

20 Claims, 4 Drawing Sheets

OTHER PUBLICATIONS

"Innosoft-Directory Solutions-LDAP World-Welcome" Innosoft International Inc. available at <<http://www.innosoft.com/ldapworld/>>, printed Oct. 18, 2004, 2 pages.

"Introduction to LDAP," LDAP Project Version 0.1, available at <<http://ldap-project.berkeley.edu/reports/introduction/LDAPintro-longer.html>>, printed Oct. 12, 2004, 4 pages.

Raithel, et al., "Gauntlet for IRIX Administrator's Guide Version 4.1," 'Online! 1999, XP002364766 available at <<http://techpubs.sgi.com/library/manuals/2000/007-2826-005.pdf>>, retrieved on Jan. 26, 2006, pp. 95-99.

"Secure Directory Solutions," Nexorplore A Nexor White Paper, available at <<www.nexor.com>>, Nov. 2002, 10 pages.

Symlabs: "Symlabs Directory Extender, Document Version 2.0," Technical White Paper, 'Online! May 2004, XP002364764, available at <<http://www.symlabs.com/Products/DirextWP_A4.pdf>>, 'retrieved on Jan. 26, 2006, pp. 1-15.

"Virtual Directory Engine," Octet String, available at <<http://www.octetstring.com/products/VDE.php>>, printed on Oct. 18, 2004, 4 pages.

* cited by examiner

RESOURCE IDENTIFIER ZONE TRANSLATION

TECHNICAL FIELD

The present invention generally relates to network environments and more particularly relates to resource identifier zone translation.

BACKGROUND

Users have access to a wide variety of resources over a network. For example, a user may access a web site to obtain stock quotes, business related information, and so on. Additionally, as the amount of resources available via a network continues to expand, the number of users that desire access to the resource may also increase. This may result in the provision of resources which were configured for one "zone" of the network environment to be implemented in another "zone", for which, implementation of the resource was not originally intended and therefore may not be suitable for implementation.

A web page, for instance, may be provided by a billing department of a corporation for access over a corporate intranet, which may be considered a zone of a network environment. During the deployment of the web page for use by the billing department over the corporate intranet, development of the web page may also continue such that the functionality provided by the web page is applicable to users "outside" of the corporate intranet. Accordingly, the billing department may also desire to provide access to the web page over the Internet (another zone) to provide access to the functionality of the web page to a wider range of users and/or make the web page available from a greater number of locations. For example, the web page may be accessed by users within the corporate intranet to enter billing information and by partners outside the corporate intranet which are to receive the billing information. However, the web page may not be suitable "as is" for use over the Internet. Links which are included on the web page, for instance, may utilize network addresses that are specific to the corporate intranet. Therefore, these links may be "broken" when published over the Internet such that the links are not selectable to cause navigation to the referenced network address.

Therefore, there is a continuing need for zone translation.

SUMMARY

Methods, systems and apparatus are described for zone translation. In an implementation, a method includes in a network environment having at least two separate resource identifier (ID) zones, collecting translation information from first and second information producers. The translation information describes translation of a resource ID between first and second resource ID zones. The collected translation information is distributed to one or more consumers for translating a resource suitable for implementation in the first resource ID zone such that the translated resource is suitable for implementation in the second resource ID zone.

In another implementation, a method includes receiving a distribution of translation information obtained from first and second information producers from respective first and second resource ID zones of a network environment. A resource suitable for implementation in the first resource ID zone is translated such that the translated resource is suitable for implementation in the second resource ID zone.

BRIEF DESCRIPTION OF THE DRAWINGS

The same reference numbers are utilized in instances in the discussion to reference like structures and components.

DETAILED DESCRIPTION

Overview

Methods, systems and apparatus are described for resource identifier zone translation. Resources, such as web pages of web sites, are often published on both an internal network and the internet, both of which may be considered different "zones" of a network environment for implementation of the web page. Zones may correspond to portions of a network environment where the resource is represented with a particular fully qualified domain name (FQDN). A resource identifier (e.g., a network address) uniquely identifies a resource, such as by a universally unique identifier (UUID). For example, domain names used on the Internet are typically formatted differently than those used on the internal network. An internal web page for a company named "Contoso Corporation", for instance, may be accessible via an internal network address "http://portal" and via the Internet network address "http://portal.contoso.com". Thus, the internal network may be considered a "zone" of the network environment which contains resource identifiers (e.g., network addresses) which are not suitable for accessing the internal web page from the other "zone" of the network environment, which in this example is the Internet.

Continuing the example above, because the web page was originally configured for use in the internal network, the web page may include links which utilize internal resource identifiers. These links may therefore be "broken" when the internal web page is accessed from the Internet. For example, the internal web page may include a link that references an internal network address "http://teams/main.htm". When the internal web page is published to the Internet, the link is therefore "broken" and thus is not suitable for implementation in the other zone (e.g., the Internet) of the network environment. Accordingly, in an implementation, a centralized mechanism is described for collecting, managing and distributing translation information for resource identifiers such that links to a resource which was originally configured for implementation in a particular zone of a network environment (e.g., a corporate intranet) may be translated for implementation in another zone of the network environment, e.g., the Internet. In the following discussion, an exemplary environment is first described which is suitable for implementing the techniques for zone translation. Exemplary procedures are then discussed which may be implemented in the exemplary environment, as well as other network environments.

Exemplary Environment

Figure 1:
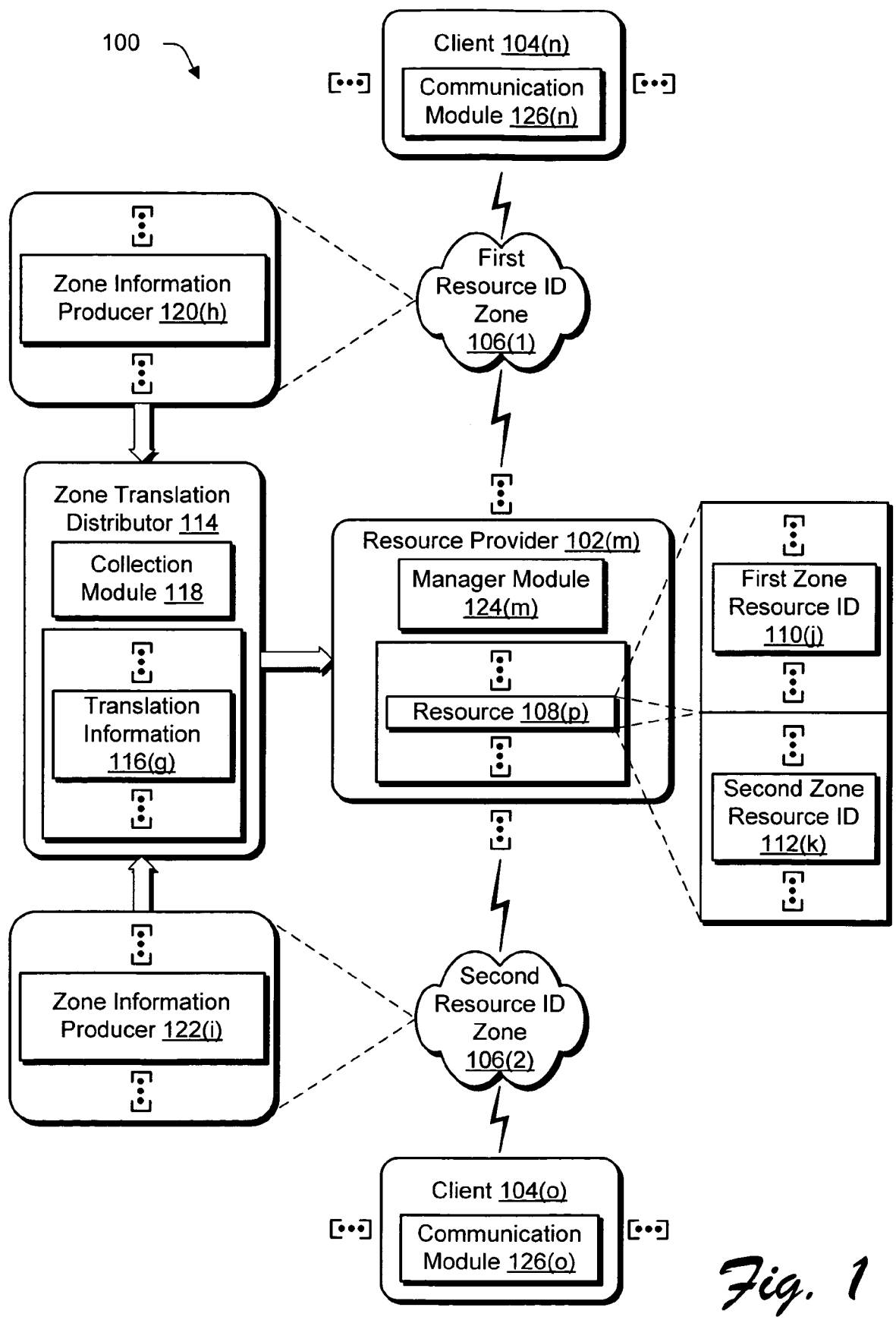
FIG. 1 is an illustration of a network environment in an exemplary implementation that is operable to collect translation information for translating a resource for implementation in differing zones of the network environment.

FIG. 1 is an illustration of a network environment 100 in an exemplary implementation that is operable to collect translation information for translating a resource for implementation in a different zone of a network environment. The illustrated environment 100 includes a plurality of resource providers 102(m), where "m" can be any integer from one to "M", and a plurality of clients 104(n104(o), where "n" can be any integer from one to "N" and "o" can be any integer from one to "O". The clients 104(n), 104(o) may be configured in a variety of ways. For example, one or more of the clients 104(n), 104(o) may be configured as a computing device that is capable of communicating over a network environment, such as a desktop computer, a mobile station, an entertainment appliance, a set-top box communicatively coupled to a display device, a wireless phone, a game console, and so forth. Thus, the clients 104(n), 104(o) may range from full resource devices with substantial memory and processor resources (e.g., personal computers, game consoles) to a low-resource device with limited memory and/or processing resources (e.g., traditional set-top boxes, hand-held game consoles). In the following discussion, the clients 104(n), 104(o) may also relate to a person and/or entity that operate the clients. In other words, clients 104(n), 104(o) may describe logical clients that include users and/or devices.

Clients 104(n) are illustrated as communicatively coupled to the resource provider 102(m) via a first resource identifier (ID) zone 106(1). Likewise, clients 104(o) are illustrated as communicatively coupled to the resource provider 102(m) via a second resource ID zone 106(2). Each of the first and second resource ID zones 106(1), 106(2) defines respective portions of the network environment 100 which utilize different resource IDs (e.g., network addresses) to access a plurality of resources 108(p), where "p" can be any integer from one to "P", available from the resource provider 102(m). For example, the first resource ID zone 106(1) and the second resource ID zone 106(2) may be different types of networks, such as a wide area network (WAN), a local area network (LAN), a wireless network, a public telephone network, an intranet, and so on. In another example, the first and second resource ID zones 106(1), 106(2) may be configured from the same network, but which utilize different resource IDs for a variety of considerations, such as for security, differing conditional access rights for access to the resource 108(p), resource 108(p) management, and so on. Thus, the network environment 100, and more particularly the first and second resource ID zones 106(1), 106(2) may be configured from a single network or a combination of multiple networks. Although first and second resource ID zones 106(1), 106(2) will be described in the following discussion for the sake of clarity and brevity, the network environment 100 may also include more than two resource ID zones.

The resource 108(p) is illustrated as including a plurality of first zone resource IDs 110(j), where "j" can be any integer from one to "J", and a plurality of second zone resource IDs 112(k), where "k" can be any integer from one to "K". The resource 108(p) may be configured in a variety of ways, such as a web page, an application, a file, a downloadable song, and so on, further discussion of which may be found in relation to FIG. 2. The plurality of first zone resource IDs 110(j), for instance, may represent network addresses which correspond to the first resource ID zone 106(1). Likewise, the plurality of second zone resource IDs 112(k) may represent network addresses which correspond to the second resource ID zone 106(2). For example, first zone resource ID 110(j) may reference another one of the plurality of resource 108(p), such as a hypertext link, configured for use in the first resource ID zone 106(1).

In another example, the first zone resource ID 110(j) may represent the network address of the resource 108(p) itself which is configured for implementation in the first resource ID zone 106(1). Likewise, in this example, the second zone resource ID 112(k) represents the network address of the resource 108(p) itself for implementation in the second resource ID zone 106(2). Thus, the resource 108(p) may be accessed utilizing different resource IDs (e.g., network addresses) depending on the zone (e.g., the first or second resource ID zones 106(1), 106(2)) from which the accessing is performed.

A multitude of resources may be provided by the plurality of resource providers 102(m) for access in the network environment. For instance, although this example describes a particular resource 108(p), the resource provider 102(m) may provide a wide variety of resources, such as the plurality of resources 108(p) as illustrated in FIG. 1. Additionally, each of the plurality of resource providers 102(m) may also provide a plurality of resources. To obtain data which is suitable to translate this multitude of resources for implementation in the different resource ID zones, the network environment 100 includes a zone translation distributor 114 which is configured to collect a plurality of translation information 116(g), where "g" can be any integer from one to "G".

The zone translation distributor 114, for instance, may include a collection module 118 which is executable to collect translation information from the first and second resource ID zones 106(1), 106(2). For example, the first resource ID zone 106(1) may include a plurality of zone information producers 120(h), where "h" can be any integer from one to "H". The zone information producers 120(h) may be configured as a wide variety of devices and software which provide information which may be utilized to translate resource IDs (e.g., network addresses) for use in different zones of the network environment 100. For example, the zone information producer 120(h) may be configured as a device that translates and/or routes network addresses, such as a load-balancing server, a network address translation device, a web proxy server, a web server, a firewall device, a network router, and so on. In another example, the zone information producer 120(h) may include software, such as through examination of a web page having listings of resource ID translations, an application that is provided by an administrator to include manual mappings of translation information, and so on. Likewise, the second resource ID zone 106(2) may also include a plurality of zone information producers 122(i), where "i" can be any integer from one to "I", which may be configured as devices, software, and so on.

The collection module 118, when executed by the zone translation distributor 114, collects and stores the translation information 116(g) from the zone information producers 120(h), 122(i). Thus, the zone translation distributor 114 may act a centralized source of translation information 116(g) for the network environment 100. The zone translation distributor 114 may then distribute the translation information 116(g) to "consumers" which may then utilize this information to translate resources for use in different zones. For example, the zone translation distributor 114 may communicate the translation information 116(g) to the resource provider 102(m). The resource provider 102(m), through execution of a manager module 124(m), may then translate the resources 108(p) for use in the first and/or second resource ID zones 106(1), 106(2). For instance, the manager module 124(m) may translate the first zone resource ID 110(j) of resource 108(p) for use in the second resource ID zone 106(2). The translated resource 108(p) may then be suitable for implementation in the second resource ID zone 106(2), such as through translation of links which refer to local addresses to Internet addresses which are suitable for implementation over the Internet.

Links to resources 108(p) translated for implementation in the first resource ID zone 106(1) may then function as intended when accessed by the client 104(n). For example, the client 104(n) may execute a communication module 126 (n) to access a web page that is translated for use from a corporate intranet to user over the Internet, such as by translating links in the web page. In another instance, resources 108(p) translated for implementation in the second resource ID zone 106(2) may then be accessed by the client 104(o). For example, the network address of the resource 108(p) itself may be translated such that it is accessible by the client 104(o). Further discussion of resource translation may be found beginning in relation to FIG. 3.

Although the functionality of the clients 104(n), 104(o), zone information producers 120(h), 122(i), zone translation distributor 114, and resource provider 102(m) is illustrated separately, the functionality may be reorganized in a variety of ways. For example, the clients 104(o), 104(n) may each act as consumer of translation information 116(g) and translate resources themselves. Additionally, the clients 104(n), 104(o) may also incorporate the functionality of the zone translation distributor 114 such that the clients 104(n), 104(o) may obtain the translation information 116(g) directly from the zone information producers 120(h), 122(i) without utilize the zone translation distributor 114. A variety of other instances are also contemplated.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the collection, distribution, and translation techniques described below are platform-independent, meaning that the techniques may be implemented on a variety of commercial computing platforms having a variety of processors.

Figure 2:
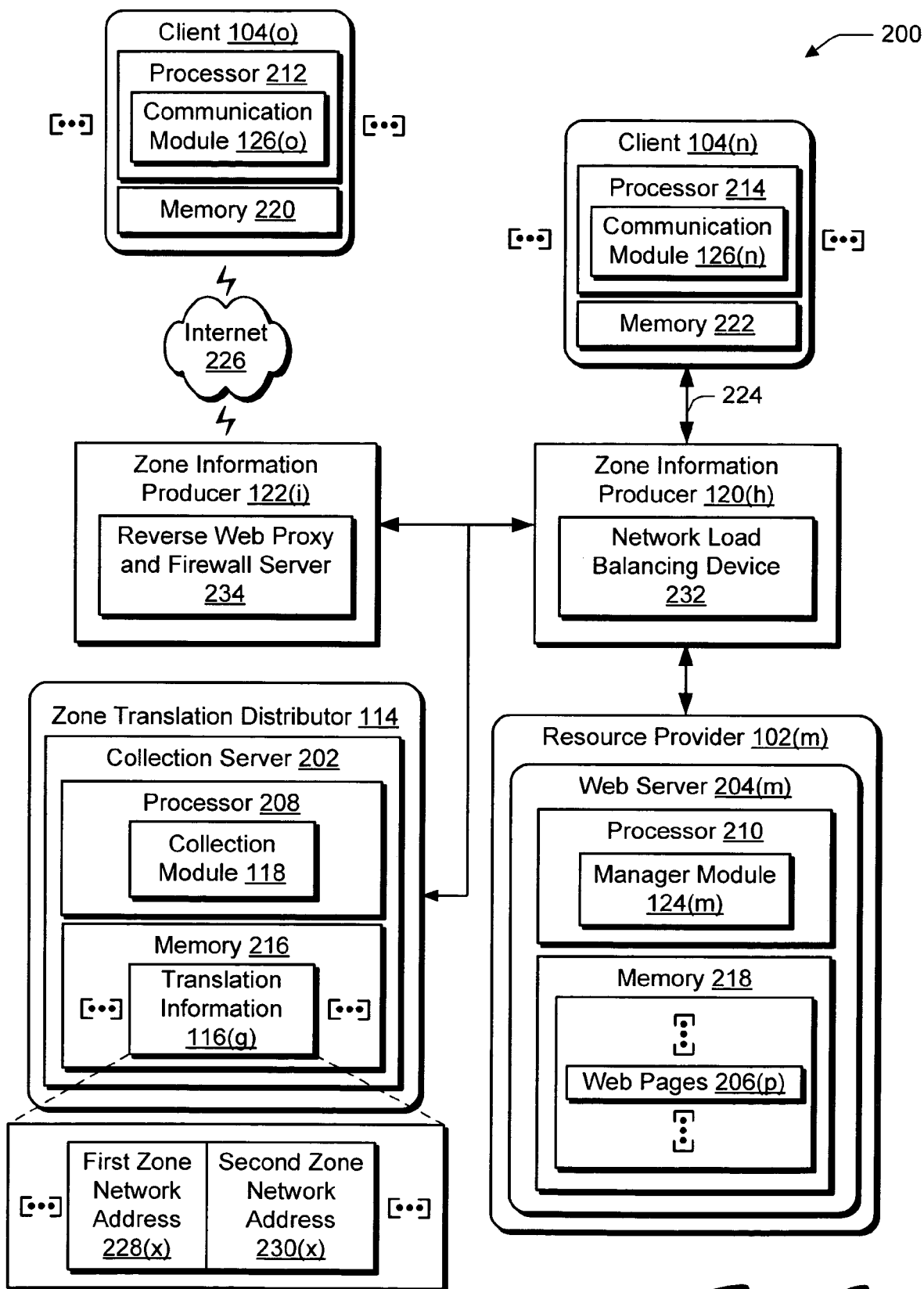
FIG. 2 is an illustration of a system in an exemplary implementation showing a resource provider, clients, zone information producers and zone translation distributor of FIG. 1 in greater detail.

FIG. 2 is an illustration of a system 200 in an exemplary implementation showing the resource provider 102(m), clients 104(n), 104(o), zone information producers 120(h), 122 (i), and zone translation distributor 114 of FIG. 1 in greater detail. The zone translation distributor 114 is illustrated as including a collection server 202, and the resource provider 102(m) is illustrated as including a web server 204(m). Accordingly, the plurality of resources 108(p) of FIG. 1 is illustrated as a plurality of web pages 206(p) in this example. The clients 104(o), 104(n) are illustrated as client devices, which may be configured in a wide variety of ways as previously described. The collection server 202, web server 204 (m), client 104(o), and client 104(n) are each illustrated as including a respective processor 208, 210, 212, 214 and memory 216, 218, 220, 222.

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 216-222 is shown, respectively, for the collection server 202, web server 204(m), client 104(o), and client 104(n), a wide variety of types and combinations of memory may be employed, such as random access memory (RAM), hard disk memory, removable medium memory, and so forth.

In the system 200 of FIG. 2, the resource provider 102(m), and consequently the web server 204(m), are configured to provide web pages 206(p) (i.e., the resources 108(p) of FIG. 1) over a first resource ID zone which includes the client 104(n) and the zone information producer 120(h) which are communicatively coupled, one to another, over a network 224. The network 224 may be configured in a wide variety of ways, such as a corporate intranet. The web server 204(m) is also configured to provide the web pages 206(p) over a second resource ID zone which includes the client 104(o) and zone information producer 122(i), which are communicatively coupled via the Internet 226. Thus, in this example, the resource IDs correspond to network addresses which are suitable for implementation in particular zones of a network environment.

One of web pages 206(p), for instance, may have been originally configured for access via the network 224, such as by including links to another one of the web pages 206(p) that utilize network addresses that are specific to the network 224. To translate the web pages 206(p) for use over the Internet 226, the manager module 124(m) may receive translation information 116(g) from the zone translation distributor 114. The translation information 116(g) is illustrated as a table which includes a plurality of first zone network addresses 228(x) and a corresponding plurality of second zone network addresses 230(x), where "x" can be any integer from one to "X". Thus, the translation information 116(g) may be utilized to translate a first zone network address 228(x) to a second zone network address 230(x), and vice versa. A variety of other translation techniques may also be employed. For example, the resource provider 102(m) may decide based on the translation information 116(g) that an original link should not be routed as usual, such as resolving a network address using DNS and communicating the link to it. Instead, the original link may be modified to refer to a specified server, and also include the original link. The specified server may then be utilized to resolve the original link. Thus, this server may be resolved from the translation information 116(g), rather than using a DNS.

To collect the translation information, the zone translation distributor may execute a collection module 118 to obtain the information from zone information producers 120(h), 122(i). For example, the zone information producer 120(h) of the first network zone is illustrated as including a network load balancing device 232. The network load balancing device 232 may balance a network load between the plurality of web servers 204(m) of the respective plurality of resource providers 102(m). Accordingly, the zone information producer 120 (h) (e.g., the network load balancing device 232) may include translation information which describes network addresses that are published by the network load balancing device 232.

Likewise, the zone information producer 122(i) may include a reverse web proxy and firewall server 234 which includes information that describes network addresses published by that device for use in the respective zone. The zone information producer 122(i) may publish internal network addresses, such as "//portal" and "//teams" on the Internet as "//portal.contoso.com" and "//teams.contoso.com". The published information may specify how the network addresses are to be translated for use between the resource ID zones. For example, the information may specify that "//portal" for use over the network 224 is to be mapped to "//portal.contoso. com" for use over the Internet 226, that "//team" is to be mapped to "//team.contoso.com" for use over the Internet 226, and so on.

The zone translation distributor 114, through collection of translation information 116(g) from a plurality of zone information producers (which in this instance are also configured for implementation in the different resource ID zones), may serve as a centralized collection point for the translation information 116(g) of the system 200. Therefore, the manager module 124(m) may receive the translation information 116 (g) from a single source and apply it to the web pages 206(p) to configure the web pages 206(p) for implementation over the network 224 and/or the Internet 226.

Exemplary Procedures

The following discussion describes collection, distribution, and translation techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the network environment 100 of FIG. 1 and the system 200 of FIG. 2.

Figure 3:
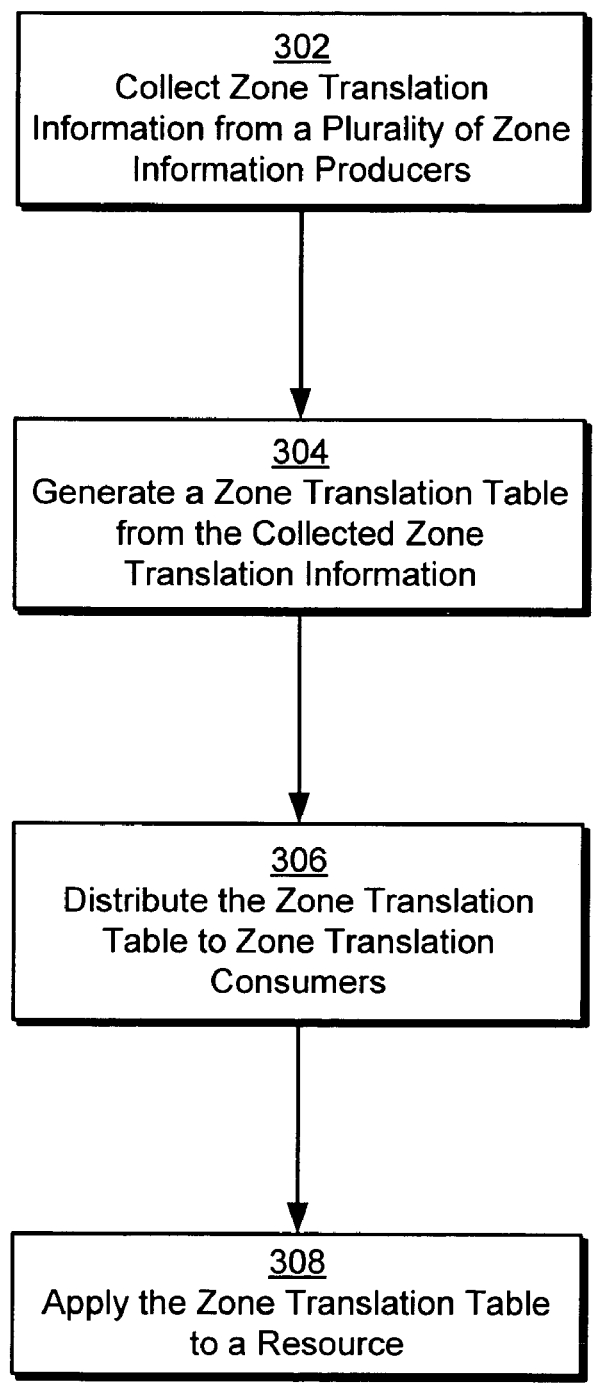
FIG. 3 is a flow diagram depicting a procedure in an exemplary implementation in which translation information is collected from a plurality of zone information producers for translating a resource.

FIG. 3 is a flow diagram depicting a procedure 300 in an exemplary implementation in which translation information is collected from a plurality of zone information producers for translating a resource. In this procedure, zone information producers, a zone translation distributor, and a zone information consumer are described. Each name relates to a relationship of the entity with translation information. For example, referring again briefly to the system 200 of FIG. 2, examples of zone information producers 120(h), 122(i) are shown, which are entities which contribute translation information in the network environment. The system 200 also includes zone translation consumers (e.g., resource provider 102(m)) which are entities that consume the translation information in the network environment. For example, the web server 204(m) may utilize the translation information to translate the web pages 206(p) for output in different resource ID zones. The translation information utilized to perform the translation is collected by the zone translation distributor 114 for distribution to the zone translation consumer(s).

First, translation information is collected from a plurality of zone information producers (block 302). The collecting may be performed in a variety of ways and from a variety of zone information producers. For example, each zone information producer may send all relevant translation information to the zone translation distributor in what may be referred to as a "push" communication model. The zone information producer, for instance, may broadcast a message when logging onto a network of its network address for receipt by each zone information producer. In another instance, the zone information producers may "discover" the zone translation distributor, such as upon connection of the zone information producers to a network which includes the zone translation distributor.

In another example, the zone translation distributor may collect the translation information in what may be referred to as a "polling" (i.e., pull) communications model. For instance, the zone translation distributor may poll zone information producers to initiate a database of translation information, to refresh a database of translation information, and so on. In this instance, the zone translation distributor may include a list of zone information producers which are registered for providing translation information. Although polling and push communication models have been described, a wide variety of other communication techniques are also contemplated, such as manual entry of translation information by a network administrator, a resource creator, and so on.

A zone translation table may then be generated from the collected translation information (block 304). For example, the zone translation distributor may analyze the collected translation information. Based on the examination, the zone translation distributor (e.g., through execution of the collection module 118) may generate a table having entries which provide a translation of a resource ID for use in a first resource ID zone to a corresponding resource ID of a second resource ID zone, and vice versa. Thus, the zone translation table may be considered a form of the translation information that is processed for efficient translation of resource IDs.

The generated zone translation table may then be distributed to zone translation consumers (block 306). The distribution of the zone translation table may be performed in a variety of ways. For example, the zone translation distributor may support a "push" communications model, in which, the generated zone translation table is transmitted over a network to zone information consumer(s) which are registered with the zone translation distributor for receipt of translation information. In another example, a "polling" communications model is supported in which zone information consumers poll the zone information distributor for zone information. For instance, the zone information consumers may poll for particular translation information, such as translation information collected after a particular date to update translation information that is already stored by the consumer. In a further example, a "notify and poll" communication model is supported in which the zone information distributor notifies registered zone information consumers of the existence of the translation information. The zone information consumers may then poll the zone information distributor for the translation information when desired, such as during "down time" of the consumer, at regularly scheduled intervals, and so on.

The distributed zone translation table may then be applied to a resource (block 308). For example, a resource provider may translate references to resource IDs contained in a resource such that the translated resource IDs are suitable for implementation in another resource ID zone, which otherwise, would not be suitable for implementation of the resource. In another example, a resource provider may translate access to the resource itself such that the resource is suitable for being implemented in the other resource ID zone. An example of translation of a resource configured as a web page is described in relation to the following figure.

Figure 4:
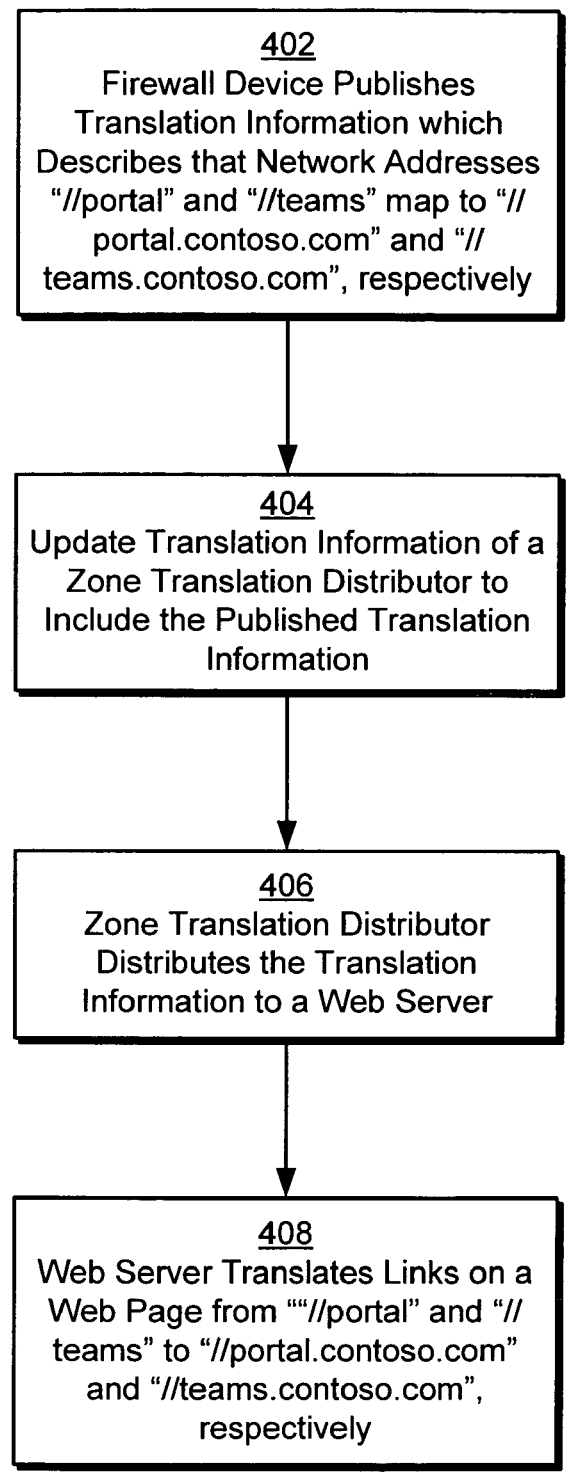
FIG. 4 is a flow diagram depicting a procedure in an exemplary implementation in which a resource configured as a web page is translated for use in a different resource ID zone.

FIG. 4 is a flow diagram depicting a procedure 400 in an exemplary implementation in which a resource configured as a web page is translated for use in a different resource ID zone. A firewall device publishes translation information which describes that network addresses "//portal" and "//teams" map to "//portal.contoso.com" and "//teams.contoso.com", respectively (block 402).

A zone translation distributor then updates translation information to include the published translation information (block 404). For example, the zone translation distributor may compare the translation information with translation information previously stored by the distributor in a database. If the translation information is not already included in the database, the distributor can add the published translation information.

Additionally, the zone translation distributor (such as through execution of the collection module 118 of FIG. 1) may also check the translation information for consistencies. For example, the translation information obtained from the firewall device may reflect updates that were made to the network environment. Therefore, the collection module may include the most recent translation information in the database. In another example, the collection module may arrive at a score which indicates a likelihood of whether the published translation information or the previously stored translation information is accurate. For example, a plurality of zone information producers may indicate that a translation from "//portal" to "//portal.contoso.com" is correct. However, the firewall device may indicate that a translation from "//portal" to "//portal.example.contoso.com" is correct. Therefore, the collection module may "choose" the translation information which was provided and/or verified by the greatest number of zone information producers. A variety of other techniques may also be utilized to check translation information.

The zone translation distributor then distributes the translation information to a web server (block 406). For example, the zone translation distributor may write the translation information to a computer readable medium that is physically delivered to a provider of the web server. In another example, the translation information is communicated over a network.

The web server then translates links on a web page from "//portal" and "//teams" to "//portal.contoso.com" and "//teams.contoso.com", respectively (block 408). Thus, a web page that was previously only suitable for implementation in an internal network (e.g., a corporate intranet) may now be suitable for implementation over an external network, such as the Internet.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising in a network environment having at least two separate resource identifier (ID) zones:
   collecting translation information, from first and second information producers, which describes translation of a resource ID between first and second said resource ID zones; and
   distributing the collected translation information to one or more consumers for translating a resource suitable for implementation in the first said resource ID zone such that the translated resource is suitable for implementation in the second said resource ID zone.

2. A method as described in claim 1, wherein the resource, before translation, is not suitable for implementation in the second said resource ID zone.

3. A method as described in claim 1, wherein the resource includes a web page.

4. A method as described in claim 1, wherein:
   the first said resource ID zone is a first network; and
   the second said resource ID zone is a second network.

5. A method as described in claim 1, wherein:
   the first said resource ID zone is an intranet; and
   the second said resource ID zone is an Internet.

6. A method as described in claim 1, wherein:
   the network environment is a single network;
   the first said resource ID zone includes a first network address for accessing the resource;
   the second said resource ID zone includes a second network address, for accessing the resource, which is different from the first network address; and
   the first network address is not suitable for accessing the resource from the second said resource ID zone.

7. A method as described in claim 1, wherein:
   the collecting and the distributing are performed by a centralized, stand-alone zone translation distributor that is separate from the one or more consumers;and
   at least one said consumer is configured as a web server.

8. A method as described in claim 1, wherein:
   the one or more consumers are configured as web servers; and
   the resource includes web pages.

9. A method as described in claim 1, wherein at least one of the first or second said information producers is configured as a device selected from the group consisting of:
   a load-balancing server;
   a network address translation device;
   a web proxy server;
   a web server;
   a firewall device; and
   a network router.

10. One or more computer readable media comprising computer executable instructions that, when executed on a computer, direct the computer to perform the method as recited in claim 1.

11. A method comprising:
    receiving a distribution of translation information obtained from first and second information producers from respective first and second resource identifier (ID) zones of a network environment; and
    using the translation information, translating a resource suitable for implementation in the first resource ID zone such that the translated resource is suitable for implementation in the second resource ID zone.

12. A method as described in claim 11, wherein the resource is a web page, a web server, or an entity that is accessible via a uniform resource locator (URL).

13. A method as described in claim 11, wherein the resource, before translation, is not suitable for implementation in the second resource ID zone.

14. A method as described in claim 11, wherein:
    the first resource ID zone is a first network; and
    the second resource ID zone is a second network.

15. A method as described in claim 11, wherein:
    the network environment is a single network; and
    the first resource ID zone includes a network address for accessing the resource that is not suitable for accessing the resource from the second resource ID zone.

16. A method as described in claim 11, wherein the receiving and the translating are performed by a web server.

17. One or more computer readable media comprising computer executable instructions that, when executed on a computer, direct the computer to perform the method as recited in claim 11.

18. One or more computer readable media comprising computer executable instructions that, when executed on a computer, direct the computer to translate a web page having a link suitable for implementation in a first resource identifier (ID) zone of a network environment, wherein:
    the web page is translated utilizing translation information that is obtainable from first and second information producers that are accessible, respectively, from the first resource ID zone and a second resource ID zone;
    the link in the web page, before translation, is not functional in the second resource ID zone; and
    the link in the translated web page is functional in the second resource ID zone.

19. One or more computer readable media as described in claim 18, wherein:
    the first resource ID zone is an intranet; and
    the second resource ID zone is an Internet.

20. One or more computer readable media as described in claim 18, wherein:
    the network environment is a single network; and
    the first resource ID zone includes a first network address for accessing the resource that is not suitable for accessing the resource from the second resource ID zone.

* * * * *

UNITED STATES PATENT AND TRADEMARK OFFICE
CERTIFICATE OF CORRECTION

| | | |
|---|---|---|
| PATENT NO. | : 7,467,189 B2 | Page 1 of 1 |
| APPLICATION NO. | : 11/040491 | |
| DATED | : December 16, 2008 | |
| INVENTOR(S) | : Yosef Siles et al. | |

It is certified that error appears in the above-identified patent and that said Letters Patent is hereby corrected as shown below:

In column 9, line 59, in Claim 7, delete "consumers;and" and insert -- consumers; and --, therefor.

Signed and Sealed this

Third Day of May, 2011

David J. Kappos
*Director of the United States Patent and Trademark Office*